United States Patent
Nishiyama

(10) Patent No.: US 8,534,749 B2
(45) Date of Patent: Sep. 17, 2013

(54) ROOF APPARATUS FOR VEHICLE

(75) Inventor: Chitose Nishiyama, Handa (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/552,739

(22) Filed: Jul. 19, 2012

(65) Prior Publication Data

US 2013/0020838 A1  Jan. 24, 2013

(30) Foreign Application Priority Data

Jul. 20, 2011  (JP) .................................. 2011-159070

(51) Int. Cl.
*B60J 7/057* (2006.01)
*B60J 7/05* (2006.01)

(52) U.S. Cl.
USPC .......................................... 296/223; 296/221

(58) Field of Classification Search
USPC .......................................... 296/216.01–224
See application file for complete search history.

(56) References Cited

U.S. PATENT DOCUMENTS

| 4,923,246 | A | * | 5/1990 | Takahashi et al. | 296/221 |
| 6,390,545 | B1 | * | 5/2002 | Makino et al. | 296/223 |
| 6,588,834 | B2 | | 7/2003 | Maeta et al. | |
| 7,708,337 | B2 | * | 5/2010 | Ito et al. | 296/224 |
| 7,914,073 | B2 | * | 3/2011 | Hotta et al. | 296/223 |

FOREIGN PATENT DOCUMENTS

JP    2002-154328    5/2002

* cited by examiner

*Primary Examiner* — Dennis Pedder
(74) *Attorney, Agent, or Firm* — Finnegan, Henderson, Farabow, Garrett & Dunner, LLP

(57) ABSTRACT

A roof apparatus for a vehicle includes a shoe member including a body member integrally including first and second sliding portions and a seat portion, the shoe member including a plate member integrally including a base portion, a stay portion, and first and second fitting portions, an engagement recess formed at the base portion, and an engagement protrusion formed at the seat portion to be elastically deformable and being inserted into the engagement recess. A distance between the first and second sliding portions is specified to be greater than a distance obtained by a sum of a length of the base portion and a projection length of the second fitting portion, and to be smaller than a distance obtained by a sum of the length of the base portion, the projection length of the second fitting portion, and a projection length of the first fitting portion.

6 Claims, 7 Drawing Sheets

Front ← → Rear

Width direction
Inside ← → Outside

ROOF APPARATUS FOR VEHICLE

CROSS REFERENCE TO RELATED APPLICATIONS

This application is based on and claims priority under 35 U.S.C. §119 to Japanese Patent Application 2011-159070, filed on Jul. 20, 2011, the entire content of which is incorporated herein by reference.

TECHNICAL FIELD

This disclosure generally relates to a roof apparatus for a vehicle.

BACKGROUND DISCUSSION

A known roof apparatus for a vehicle is disclosed in JP2002-154328A (which will be hereinafter referred to as Reference 1). The roof apparatus disclosed in Reference 1 includes shoe members provided to be movable in a longitudinal direction of the vehicle along respective guide rails provided at both edges of an opening portion in a width direction of the vehicle, the opening portion being formed at a roof portion of a vehicle body of the vehicle. The roof apparatus also includes support members supporting a movable panel for opening and closing the opening portion. A front edge portion and a rear edge portion of each of the support members are connected to the corresponding guide rail and the shoe member, respectively. In a case where the shoe members move in the longitudinal direction of the vehicle, the movable panel is opened and closed accordingly.

As illustrated in FIG. 8, each of the shoe members includes a plate member 91 made of steel plate and a body portion 92 made of resin. The plate member 91 including an engagement hook portion 91a to which a driving force is transmitted is embedded by insert molding in the body portion 92 including a sliding portion 92a sliding on the corresponding guide rail. Therefore, a resin mold process may be complicated because of a complex mold, which may lead to an increase of manufacturing man-hours and cost.

A need thus exists for a roof apparatus for a vehicle which is not susceptible to the drawback mentioned above.

SUMMARY

According to an aspect of this disclosure, a roof apparatus for a vehicle includes a movable panel opening and closing an opening portion formed at a roof portion of a vehicle body of the vehicle, a support member supporting the movable panel, a shoe member including a body member made of resin and integrally including first and second sliding portions arranged side by side in a width direction of the vehicle and sliding on a guide rail provided at an edge portion of the opening portion in the width direction of the vehicle, and a seat portion disposed between the first and second sliding portions and connected to the first and second sliding portions in the width direction of the vehicle, the shoe member including a plate member made of steel plate and integrally including a base portion mounted to the seat portion, a stay portion engaging with the support member, and first and second fitting portions provided at first and second sides of the base portion in the width direction of the vehicle and projecting from the base portion towards the first and second sides to be fitted to the first and second sliding portions respectively, the shoe member being movable along the guide rail in a longitudinal direction of the vehicle, an engagement recess formed at the base portion to open in a height direction of the vehicle, and an engagement protrusion formed at the seat portion to be elastically deformable in the height direction of the vehicle and being inserted into the engagement recess. A distance between the first and second sliding portions is specified to be greater than a distance obtained by a sum of a length of the base portion in the width direction of the vehicle and a projection length of the second fitting portion at the second side, and to be smaller than a distance obtained by a sum of length of the base portion in the width direction of the vehicle, the projection length of the second fitting portion at the second side, and a projection length of the first fitting portion at the first side.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
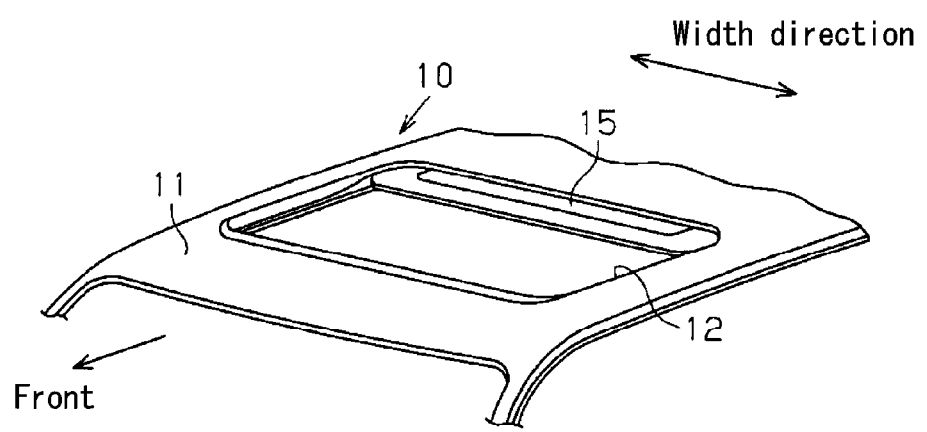
FIG. 1 is a perspective view schematically illustrating a sunroof apparatus according to an embodiment disclosed here.

An embodiment will be explained with reference to FIGS. 1 to 7. In the embodiment, directions and orientations such as left, right, front, rear, top, and bottom correspond to those when viewed from a passenger in a vehicle. As illustrated in FIG. 1, a sunroof apparatus 10 serving as a roof apparatus for a vehicle is mounted at a roof portion 11 of a vehicle body where an opening portion 12 substantially having a rectangular shape is formed. The sunroof apparatus 10 includes a movable panel 15 moving in a longitudinal direction of the vehicle so as to open and close the opening portion 12. The movable panel 15 is formed by a glass plate, for example, and is substantially formed into a rectangular shape. The movable panel 15 is mounted so as to be upwardly tiltable, downwardly tiltable, and slidable in the longitudinal direction of the vehicle. That is, the movable panel 15 performs a tilt-up operation (a tilt operation), a tilt-down operation (the tilt operation), and a slide operation. In the tilt-up operation, the movable panel 15 rotates in one direction relative to a front portion of the movable panel 15 so that a rear portion of the movable panel 15 moves upward. In the tilt-down operation, the movable panel 15 rotates in the other direction relative to the front portion of the movable panel 15 so that the rear portion moves downward. The movable panel 15 operates in an inner-sliding manner when opening and closing so as to slide in the tilt-down state.

Figure 2:
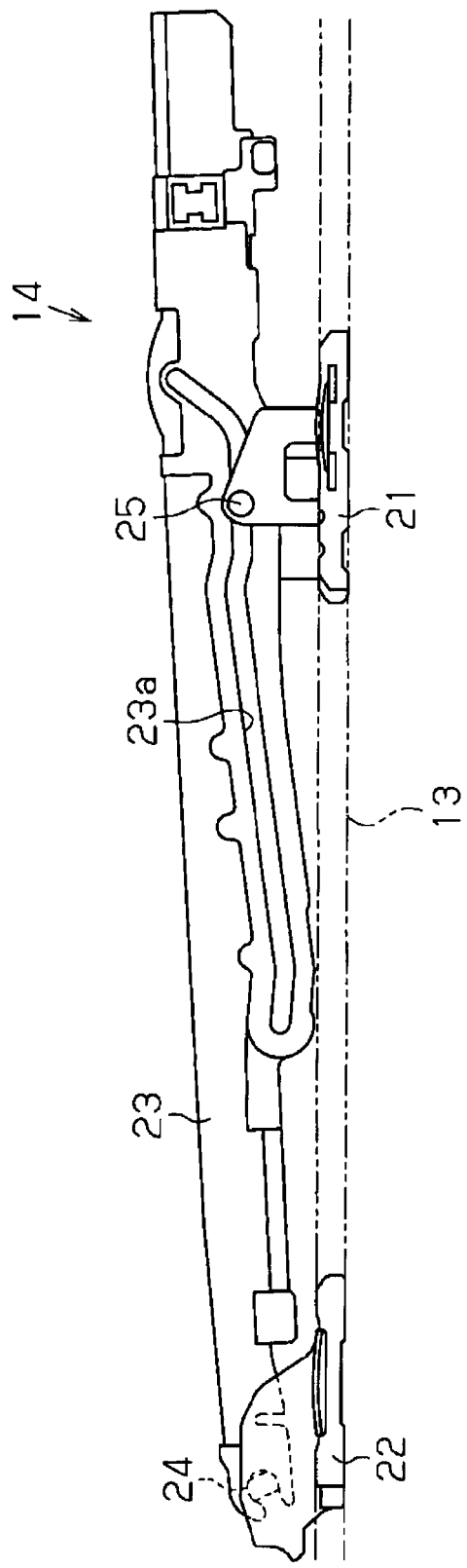
FIG. 2 is a side view of the sunroof apparatus illustrated in FIG. 1.

A pair of guide rails 13 is arranged and fixed at respective edge portions of the opening portion 12 in a width direction of the vehicle (corresponding to a width direction of the roof portion 11). FIG. 2 illustrates one of the guide rails 13. Each of the guide rails 13, which is made of an aluminum alloy extruded material, for example, extends in the longitudinal direction of the vehicle (corresponding to a longitudinal direction of the roof portion 11) while substantially having a C-shape in a cross section.

Functional members 14 are supported by the respective guide rails 13 so as to be movable in the longitudinal direction of the vehicle. Both side portions of the movable panel 15 in the width direction of the vehicle are fixed and supported by the respective functional members 14. The functional members 14 move in the longitudinal direction of the vehicle along the guide rails 13 so that the movable panel 15 performs the tilt-up operation, the tilt-down operation, and the slide operation.

Each of the functional members 14 includes a rear shoe 21 serving as a shoe member guided and supported so as to be movable along the guide rail 13 in the longitudinal direction of the vehicle. The functional member 14 also includes a front shoe 22 provided at a front side of the rear shoe 21 and guided and supported so as to be movable along the guide rail 13 in the longitudinal direction of the vehicle. The rear shoe 21 is connected to an electric motor, for example, and driven by the electric motor so as to be movable in the longitudinal direction of the vehicle.

The functional member 14 further includes a support member 23 of which a front end portion is pivotally supported by a support pin 24 provided at the front shoe 22. A center line of the support pin 24 extends in the width direction of the vehicle. The support member 23 extending in the longitudinal direction of the vehicle includes an elongated guide bore 23*a* (hereinafter simply referred to as a guide bore 23*a*) at a rear side of the support pin 24. A support pin 25 provided at the rear shoe 21 and including a center line that extends in the width direction of the vehicle is inserted into the guide bore 23*a* so that the support member 23 is rotatably connected to the rear shoe 21 and is movable in the longitudinal direction of the vehicle along the guide bore 23*a*. The movable panel 15 is fixed and supported relative to the functional member 14 at the support member 23.

In a fully closed state of the movable panel 15 as illustrated in FIG. 2, the guide bore 23*a* is formed so as to be inclined upwardly as a whole towards a rear side of the vehicle. The support pin 25 provided at the rear shoe 21 is arranged in a middle of the guide bore 23*a* in a longitudinal direction thereof while the movable panel 15 is in the fully closed state. Accordingly, in a case where the rear shoe 21 moves forward along the guide rail 13 while the movable panel 15 is in the fully closed state, the support member 23 rotates in a counterclockwise direction relative to the front end portion (i.e., relative to the support pin 24) because the support member 23 is pushed up by the support pin 25 at the guide bore 23*a*. At this time, the movable panel 15 performs the tilt-up operation where the rear portion of the movable panel 15 is raised relative to the front portion. On the other hand, in a case where the rear shoe 21 moves rearward along the guide rail 13 while the movable panel 15 is in the fully closed state, the support member 23 is pushed down by the support pin 25 at the guide bore 23*a* so that the movable panel 15 performs the tilt-down operation where the rear portion of the movable panel 15 is lowered relative to the front portion.

In the tilt operation of the movable panel 15, the movement of the front shoe 22 in the longitudinal direction of the vehicle while the front shoe 22 is being pushed by the support member 23 via the support pin 24 is restricted by a check member. In a case where the support pin 25 reaches a rear end portion of the guide bore 23*a* in association with the rearward movement of the rear shoe 21 along the guide rail 13, the tilt-down operation of the movable panel 15 is completed. At this time, the restriction of the rearward movement of the front shoe 22 by the check member is configured to be released. Thus, when the rear shoe 21 further moves rearward along the guide rail 13, the support member 23 and the front shoe 22 integrally move rearward so that the movable panel 15 performs an open operation while the movable panel 15 is maintained to be in the tilt-down state. As a result, the movable panel 15 is brought to a fully open state so as to open the opening portion 12.

On the other hand, in a case where the rear shoe 21 moves forward along the guide rail 13 in the fully open state of the movable panel 15, the rotation of the support member 23 relative to the front end portion (i.e., relative to the support pin 24) is restricted by the check member. Thus, the support member 23 and the front shoe 22 integrally move forward so that the movable panel 15 performs a close operation while the movable panel 15 is maintained to be in the tilt-down state. When the movable panel 15 returns to a state or a position where the tilt-down operation is completed as mentioned above, the restriction of the rotation of the support member 23 is released while the movement of the front shoe 22 in the longitudinal direction of the vehicle is restricted by the check member. Thus, when the rear shoe 21 further moves forward along the guide rail 13 in such state, the support member 23 is pushed up by the support pin 25 at the guide bore 23*a* so that the movable panel 15 performs the tilt-up operation and returns to the fully closed state.

Next, the rear shoe 21 will be explained in detail. As illustrated in FIGS. 6A, 6B, 6C, 6D, 7A, and 7B, the rear shoe 21 includes a body member 31 made of resin and a plate member 41 made of steel plate. The body member 31 integrally includes first and second sliding portions 32, 33, and a seat portion 34. The first and second sliding portions 32 and 33 are arranged side by side in the width direction of the vehicle so as to slide on the guide rail 13. The seat portion 34 is disposed between the first and second sliding portions 32 and 33 so as to be connected thereto in the width direction of the vehicle. The seat portion 34 extends in a planar form between the first and second sliding portions 32 and 33 while being positioned at a middle portion of the first and second sliding portions 32 and 33 in the longitudinal direction and a height direction of the vehicle.

Figure 4A:
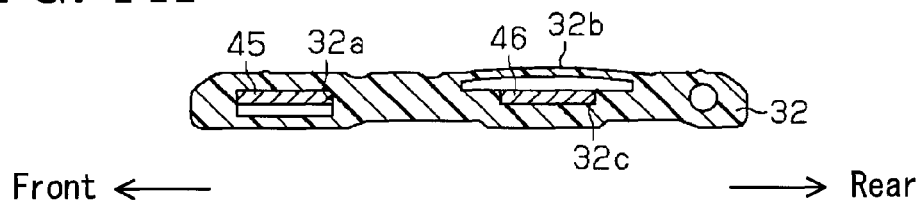
FIG. 4A is a cross-sectional view taken along line IVA-IVA illustrated in FIG. 3.

A fitting bore 32*a* substantially having a rectangular shape is formed at a front end portion of the first sliding portion 32 projecting forward relative to the seat portion 34. As illustrated in FIG. 4A, the fitting bore 32*a* extends through the first sliding portion 32 in the width direction of the vehicle. In addition, the first sliding portion 32 includes a first deflection portion 32*b* curved in the height direction of the vehicle and supported at two positions separated from each other in the longitudinal direction of the vehicle within a range of the seat portion 34 in the longitudinal direction of the vehicle. In a case where the first sliding portion 32 slides on the guide rail 13, the first deflection portion 32*b* is elastically in contact with the guide rail 13 to thereby stabilize the operation of the first sliding portion 32 relative to the guide rail 13 while a sliding resistance is restrained, for example. Further, a fitting groove 32c is formed at the first sliding portion 32 so as to be positioned at a lower side of a middle portion of the first deflection portion 32b in the longitudinal direction of the vehicle. The fitting groove 32c formed by a U-shaped groove extends through the first sliding portion 32 in the width direction of the vehicle. That is, the fitting groove 32c opens at a side facing the first deflection portion 32b as illustrated in FIG. 4A.

Figure 6A:
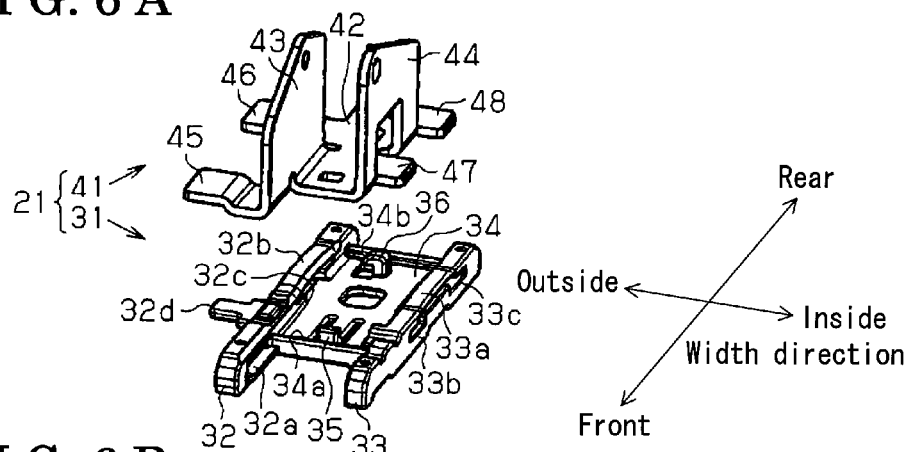
FIGS. 6A, 6B, 6C, and 6D are perspective views each illustrating an assembly process of a rear shoe of the sunroof apparatus.

As illustrated in FIG. 6A, a connection piece 32d having a flange shape is formed at the first sliding portion 32 within a range of the seat portion 34 disposed between the fitting bore 32a and the fitting groove 32c in the longitudinal direction of the vehicle so as to outwardly project in the width direction of the vehicle.

Figure 4B:
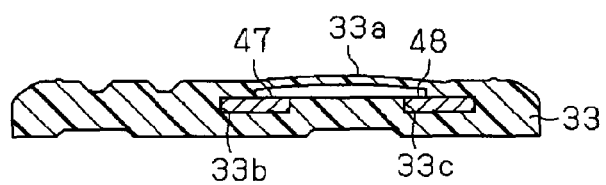
FIG. 4B is a cross-sectional view taken along line IVB-IVB illustrated in FIG. 3.

As illustrated in FIG. 4B, the second sliding portion 33 includes a second deflection portion 33a curved in the height direction of the vehicle and supported at two positions separated from each other in the longitudinal direction of the vehicle within the range of the seat portion 34 in the longitudinal direction of the vehicle. The second deflection portion 33a is substantially symmetric to the first deflection portion 32b of the first sliding portion 32. First and second fitting holes 33b and 33c are formed at the second deflection portion 33a so as to be positioned at a lower side of front and rear portions of the second deflection portion 33a. The first and second fitting holes 33b and 33c each substantially having a rectangular shape extends through the second deflection portion 33a in the width direction of the vehicle. Upper sides of a rear portion of the first fitting hole 33b and a front portion of the second fitting hole 33c facing the second deflection portion 33a are open. That is, the first and second fitting holes 33b and 33c are arranged so as not to overlap a top portion of the second deflection portion 33a in the height direction of the vehicle.

Figure 7A:
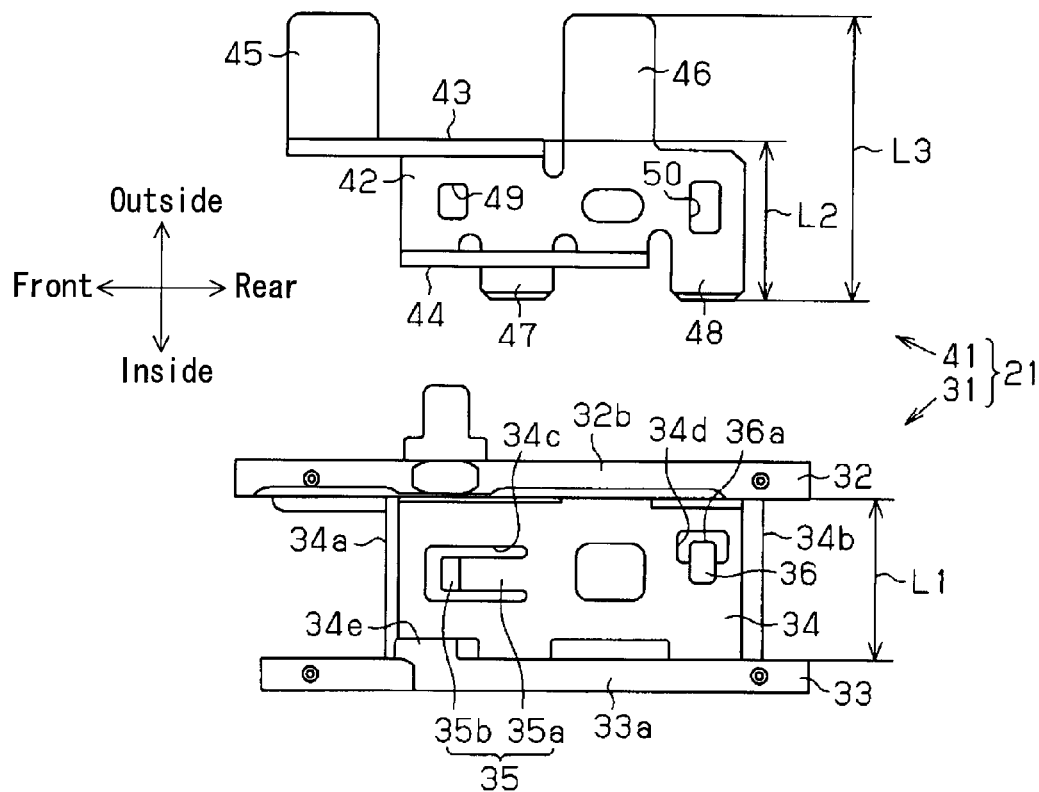
FIGS. 7A and 7B are plan views each illustrating the assembly process of the rear shoe of the sunroof apparatus.

As illustrated in FIG. 6A, a front rib 34a serving as a first rib and a rear rib 34b serving as a second rib are provided along a front edge and a rear edge of the seat portion 34 respectively so as to project in the height direction of the vehicle. As illustrated in FIG. 7A, a cut portion 34c substantially formed into a C-shape to open rearward is formed at the seat portion 34 so as to be positioned at a rear side of the front rib 34a. An engagement protrusion 35 defined by the cut portion 34c is also formed at the seat portion 34. The engagement protrusion 35 includes a planar piece 35a supported at a rear end of the engagement protrusion 35 in a cantilevered manner, and an engagement piece 35b projecting upward in a substantially square pole shape at a front end of the planar piece 35a. A cut portion 34d substantially formed into a rectangular shape is formed at the seat portion 34 so as to be positioned at a front side of the rear rib 34b. A hook portion 36 projecting in the height direction of the vehicle is arranged next to the cut portion 34d at an inner side in the width direction of the vehicle. The hook portion 36 includes a hook 36a partially overlapping the cut portion 34d in a plan view. That is, the hook 36a projects outwardly in the width direction of the vehicle.

The plate member 41 is obtained by a bending and forming of a single plate punched out from a steel plate. As illustrated in FIG. 7A, the plate member 41 includes a base portion 42 having a planar shape and mounted to the seat portion 34, and first and second stay portions 43 and 44 provided along inner and outer edges of the base portion 42 in the width direction of the vehicle so as to project upwardly. Both ends of the support pin 25 are fixed to the first and second stay portions 43 and 44. The first and second stay portions 43 and 44 support therebetween the support member 23 by means of the support pin 25. That is, the first and second stay portions 43 and 44 engage with the support member 23.

The first stay portion 43 extends in the longitudinal direction of the vehicle so as to project towards a front side of the vehicle relative to the base portion 42. A first fitting projection 45 having a flange shape is provided at an outer side of a front end of the first stay portion 43 in the width direction of the vehicle so as to extend outwardly in the width direction. A second fitting projection 46 having a flange shape is provided at the outer side of a rear end of the first stay portion 43 in the width direction of the vehicle so as to extend outwardly in the width direction. Projection lengths of the first and second fitting projections 45 and 46 from the base portion 42 in the width direction of the vehicle are specified to be substantially the same. As illustrated in FIG. 4A, the first and second fitting projections 45 and 46 are inserted into the fitting bore 32a and the fitting groove 32c of the first sliding portion 32 respectively. Specifically, the second fitting projection 46 is fitted to or inserted into the fitting groove 32c in a state to be exposed to the first deflection portion 32b in the height direction of the vehicle within a range of a portion of the first deflection portion 32b including a top portion thereof in the longitudinal direction of the vehicle. The first fitting projection 45 and the second fitting projection 46 each serve as a first fitting portion.

Figure 3:
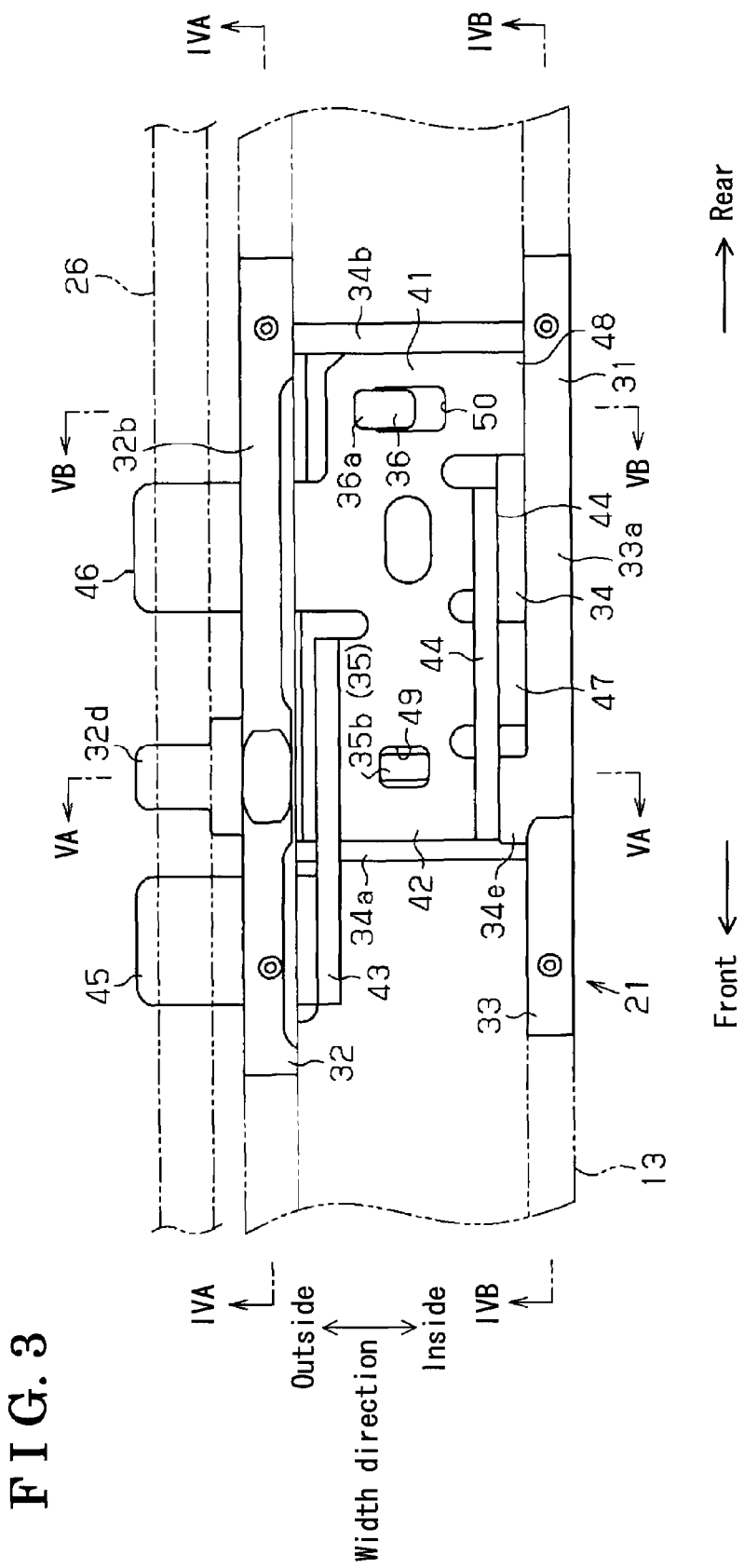
FIG. 3 is a plan view of the sunroof apparatus illustrated in FIG. 1.

As illustrated in FIG. 3, end portions of the first and second fitting projections 45 and 46 are connected to an appropriate driving force transmission member (for example, a driving belt) 26, together with the connection piece 32d of the body member 31. The driving force transmission member 26 is connected to a drive motor so as to be driven by the drive motor. In a case where the driving force transmission member 26 is driven by the drive motor so as to move along the guide rail 13 in the longitudinal direction of the vehicle, the rear shoe 21 moves in the longitudinal direction of the vehicle in association with the movement of the driving force transmission member 26.

The second stay portion 44 extends in the longitudinal direction of the vehicle so as to project towards a rear side of the vehicle relative to the first stay portion 43. That is, the second stay portion 44 is arranged to be displaced rearward relative to the first stay portion 43. First and second fitting pieces 47 and 48 each having a flange shape are formed at the base portion 42 so as to be positioned at an intermediate portion of the second stay portion 44 in the longitudinal direction of the vehicle and a rear side of the second stay portion 44 respectively. Specifically, the first and second fitting pieces 47 and 48 are provided at an inner side of the second stay portion 44 in the width direction of the vehicle so as to inwardly project in the width direction. Projection lengths of the first and second fitting pieces 47 and 48 from the base portion 42 to the inside in the width direction of the vehicle are specified to be the same. As illustrated in FIG. 4B, the first and second fitting pieces 47 and 48 are fitted to or inserted into the first and second fitting holes 33b and 33c of the second sliding portion 33 respectively. Specifically, the first and second fitting pieces 47 and 48 are exposed to the second deflection portion 33a in the height direction of the vehicle within a range of a portion of the second deflection portion 33a excluding the top portion thereof in the longitudinal direction of the vehicle. The first and second fitting pieces 47 and 48 are arranged to be displaced rearward relative to the first and second fitting projections 45 and 46 respectively to thereby punch out the single plate for manufacturing the plate member 41 from the steel plate without difficulty. As illustrated in FIG. 7A, the projection length of each of the fitting pieces 47 and 48 from the base portion 42 in the width direction of the vehicle is specified to be shorter than the projection length of each of the fitting projections 45 and 46 in the width direction of the vehicle. The first fitting piece 47 and the second fitting piece 48 each serve as a second fitting portion.

A distance L1 defined between the first and second sliding portions 32 and 33 of the body member 31 in the width direction of the vehicle (i.e., a width length L1 of the seat portion 34) is specified to be greater than a length (distance) L2 obtained by a sum of a length of the base portion 42 in the width direction of the vehicle and the projection length of the fitting piece 47 or 48 in the width direction of the vehicle. In addition, the length L1 is specified to be smaller than a length (distance) L3 obtained by a sum of the length of the base portion 42 in the width direction of the vehicle, the projection length of the fitting piece 47 or 48, and the projection length of the fitting projection 45 or 46.

Figure 7B:
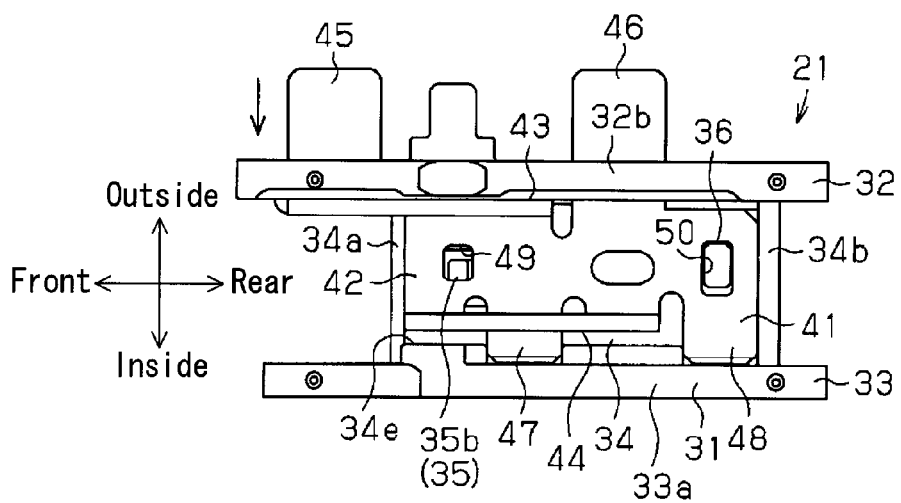
Figure 8:
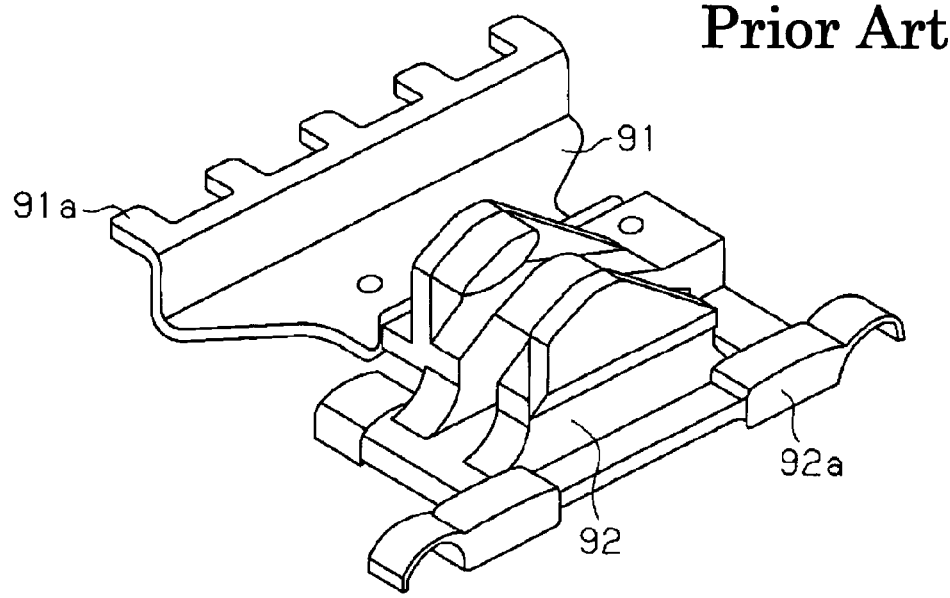
FIG. 8 is a perspective view illustrating a shoe member of a known sunroof apparatus.

Accordingly, a length $\Delta L$ (=L3−L1) obtained by subtracting the length L1 from the length L3 serves as an overall insertion allowance of the first and second fitting projections 45 and 46, and the first and second fitting pieces 47 and 48 fitted to the first and second sliding portions 32 and 33 respectively. As illustrated in FIG. 7B, in a state where at least the first and second fitting projections 45 and 46 provided at a first side of the base portion 42 in the width direction of the vehicle (i.e., at an outer side in the width direction of the vehicle and a long projection side) are fitted to the first sliding portion 32, the first and second fitting pieces 47 and 48 provided at a second side of the base portion 42 in the width direction of the vehicle (i.e., at an inner side in the width direction of the vehicle and a short projection side) are mountable, together with the base portion 42, to the seat portion 34. At this time, the front rib 34a and the rear rib 34b are in contact or closely positioned relative to a front end and a rear end (respective ends) of the base portion 42 respectively.

Figure 5A:
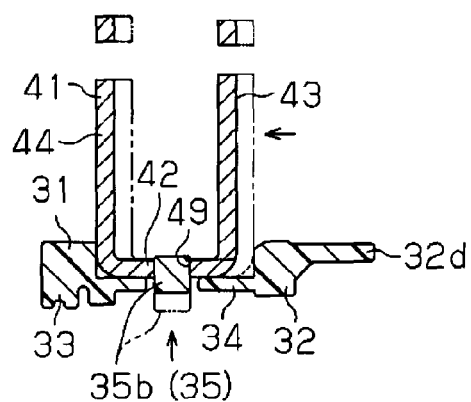
FIG. 5A is a cross-sectional view taken along line VA-VA illustrated in FIG. 3.

An engagement bore 49 substantially having a rectangular shape and serving as an engagement recess is formed at a front end portion of the base portion 42 so as to face the engagement piece 35b of the engagement protrusion 35 in the height direction of the vehicle. That is, the engagement bore 49 opens in the height direction of the vehicle. As illustrated in FIG. 5A, in a case where the base portion 42 is mounted to the seat portion 34, the engagement piece 35b is fitted to the engagement bore 49 so that the plate member 41 is positioned relative to the body member 31 in the width direction of the vehicle.

As illustrated in FIG. 7A, a restriction portion 34e is formed at the seat portion 34 so as to be continuously connected to a front end portion of the second sliding portion 33. The restriction portion 34e projects in the height direction of the vehicle. The restriction portion 34e is in contact or closely positioned relative to the base portion 42 in a state where the engagement piece 35b is fitted to or inserted into the engagement bore 49.

Figure 5B:
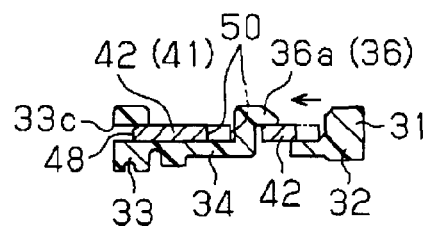
FIG. 5B is a cross-sectional view taken along line VB-VB illustrated in FIG. 3.

In addition, a through-hole 50 substantially having a rectangular shape is formed at a rear end portion of the base portion 42 so as to face the hook portion 36 in the height direction of the vehicle. As illustrated in FIG. 5B, the hook 36a of the hook portion 36 engages with an upper surface of an outer edge portion of the through-hole 50 in the width direction of the vehicle where the hook portion 36 is loosely fitted. In a case where the base portion 42 is placed on the seat portion 34, for example, the outer edge portion of the through-hole 50 in the width direction of the vehicle is disposed and sandwiched between the seat portion 34 and the hook 36a of the hook portion 36 in the height direction of the vehicle. As a result, the plate member 41 is positioned relative to the seat portion 34 (the body member 31) in the height direction of the vehicle.

Figure 6B:
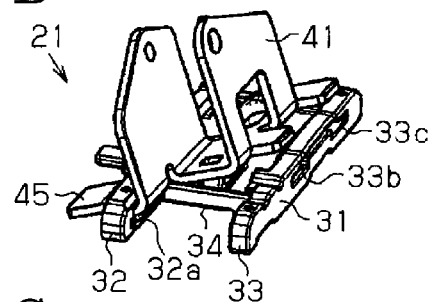

Next, an assembly operation of the rear shoe 21 according to the embodiment will be explained. As mentioned above, the length L1 defined between the first and second sliding portions 32 and 33 in the width direction of the vehicle is specified to be shorter than the length L3 obtained by the sum of the length of the base portion 42 in the width direction of the vehicle and the projection lengths of the fitting piece 47 or 48 and the fitting projection 45 or 46 provided at the first and second sides of the base portion 42 in the width direction of the vehicle. Thus, in a case where the plate member 41 is assembled on the body member 31, the plate member 41 is first arranged at an upper side of the body member 31 as illustrated in FIG. 6A. Then, the plate member 41 is inclined relative to the body member 31 in the height direction of the vehicle so that the inner side of the base portion 42 in the width direction of the vehicle is positioned higher than the outer side of the base portion 42 in the width direction of the vehicle, for example, as illustrated in FIG. 6B. Then, the first and second fitting projections 45 and 46 are fitted to or inserted into the fitting bore 32a and the fitting groove 32c of the first sliding portion 32 respectively. At this time, the first and second fitting projections 45 and 46 are excessively inserted (beyond an original insertion allowance) into the fitting bore 32a and the fitting groove 32c of the first sliding portion 32. The inclination of the second fitting projection 46 inserted into the fitting groove 32c is allowed by a clearance formed at the lower side of the first deflection portion 32b.

Figure 6C:
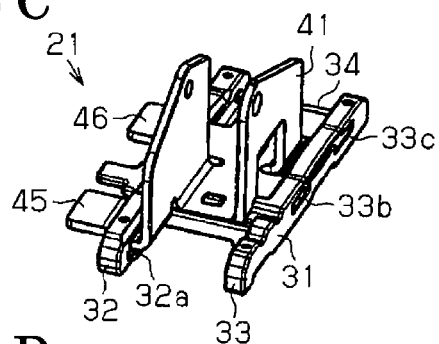

In the aforementioned state, the plate member 41 is rotated (inclined) in the height direction of the vehicle relative to the first and second fitting projections 45 and 46. As illustrated in FIGS. 6C and 7B, the first and second fitting pieces 47 and 48 provided at the second side of the base portion 42, and the base portion 42 are temporary placed on the seat portion 34. At this time, as indicated by a chain double-dashed line in FIG. 5A, the engagement protrusion 35 is pressed by the base portion 42 so as to be elastically deformed in the height direction of the vehicle. In addition, as indicated by a chain double-dashed line in FIG. 5B, the hook portion 36 is loosely inserted into the through-hole 50.

Figure 6D:
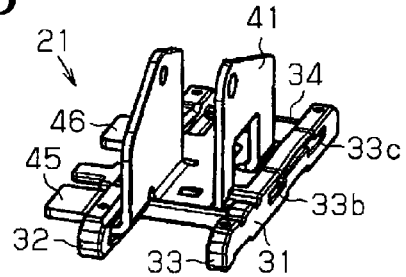

Next, in order to insert the first and second fitting pieces 47 and 48 at the second side of the base portion 42 into respective portions of the second sliding portion 33 as illustrated in FIGS. 6D and 3, the plate member 41 is moved inwardly in the width direction of the vehicle while being placed on the seat portion 34. At this time, in a case where the first and second fitting pieces 47 and 48 are excessively inserted (beyond an original insertion allowance) into the second sliding portion 33, the base portion 42 makes contact with the restriction portion 34e so that the further insertion of the first and second fitting pieces 47 and 48 is inhibited. The first and second fitting projections 45 and 46, and the first and second fitting pieces 47 and 48 are fitted to the first and second sliding portions 32 and 33 respectively by the aforementioned insertion allowance (the length $\Delta L$) as a whole.

As indicated by a solid line in FIG. 5A, the engagement protrusion 35 that is pressed by the base portion 42 and is elastically deformed in the height direction of the vehicle is released when the engagement bore 49 substantially overlaps the engagement protrusion 35 in the height direction of the vehicle. The engagement protrusion 35 is elastically returned and is inserted into the engagement bore 49. Accordingly, the plate member 41 is positioned relative to the body member 31 in the width direction of the vehicle.

At the same time, as indicated by a solid line in FIG. 5B, the hook 36a of the hook portion 36 engages with the upper surface of the outer edge portion of the through-hole 50 into which the hook portion 36 is loosely inserted. Accordingly, because the base portion 42 is disposed and sandwiched between the seat portion 34 and the hook 36a of the hook portion 36 in the height direction of the vehicle when the base portion 42 is mounted to the seat portion 34, for example, the plate member 41 is positioned relative to the seat portion 34 (the body member 31) in the height direction of the vehicle.

In addition, as illustrated in FIG. 3, the front rib 34a and the rear rib 34b are in contact with or positioned close to the front end and the rear end of the base portion 42 respectively so that the base portion 42 is positioned relative to the seat portion 34 (the body member 31) in the longitudinal direction of the vehicle.

According to the aforementioned embodiment, the body member 31 and the plate member 41 are integrally connected or united in a state where the first and second fitting projections 45 and 46 are inserted into the first sliding portion 32 while the first and second fitting pieces 47 and 48 are inserted into the second sliding portion 33 by the overall insertion allowance (i.e., the length ΔL) for the first and second fitting projections 45, 46 and the first and second fitting pieces 47 and 48, in addition to the engagement piece 35b (the engagement protrusion 35) inserted into the engagement bore 49. In this case, in order to assemble the plate member 41 on the body member 31, the plate member 41 is first inclined in the height direction of the vehicle relative to the body member 31, for example. Then, the first and second fitting projections 45 and 46 at the first side of the base portion 42 are excessively inserted (beyond the original insertion allowance) into the respective portions of the first sliding portion 32. In the aforementioned state, the plate member 41 is rotated (inclined) in the height direction relative to the first and second fitting projections 45 and 46 so that the first and second fitting pieces 47 and 48 at the second side of the base portion 42 are temporary placed on the seat portion 34 together with the base portion 42. At this time, the engagement protrusion 35 is pressed by the base portion 42 so as to be elastically deformed in the height direction. Next, in order to insert the first and second fitting pieces 47 and 48 at the second side of the base portion 42 into the respective portions of the second sliding portion 33, the plate member 41 is moved in the width direction of the vehicle on the seat portion 34. At this time, the engagement protrusion 35 that is pressed by the base portion 42 and is elastically deformed in the height direction of the vehicle is released when the engagement bore 49 substantially overlaps the engagement protrusion 35 in the height direction of the vehicle. The engagement protrusion 35 is elastically returned and is inserted into the engagement bore 49. Accordingly, the plate member 41 is positioned in the width direction of the vehicle relative to the body member 31 so as to be united to the body member 31.

Accordingly, the body member 31 and the plate member 41 may be easily manufactured as separate components and be united by subsequent simple assembly procedures to thereby obtain the rear shoe 21. As a result, manufacturing man-hours of the rear shoe 21 may be reduced.

In addition, according to the aforementioned embodiment, the plate member 41 is positioned in the longitudinal direction of the vehicle relative to the seat portion 34 (the body member 31) because of the front rib 34a and the rear rib 34b making contact or being closely positioned relative to the front end and the rear end of the base portion 42 respectively.

Then, the driving force from the driving force transmission member 26 is securely transmitted from the plate member 41 to the body member 31.

Further, according to the aforementioned embodiment, the plate member 41 is positioned in the height direction of the vehicle relative to the seat portion 34 (the body member 31) because of the base portion 42 sandwiched and disposed between the seat portion 34 and the hook 36a of the hook portion 36.

Furthermore, according to the aforementioned embodiment, the first and second fitting pieces 47 and 48 are fitted to the second sliding portion 33 within the range of the portion of the second deflection portion 33a in the longitudinal direction of the vehicle. At this time, the first and second fitting pieces 47 and 48 are exposed in the height direction of the vehicle relative to the second deflection portion 33a. As a result, an enlargement of the second sliding portion 33 in the height direction of the vehicle is restrained and further an enlargement of the guide rail 13 in the height direction is restrained. A decrease of a head clearance in association with the enlargement of the guide rail 13, for example, in the height direction is restrained. In addition, because the first and second fitting pieces 47 and 48 are arranged so as not to overlap the top portion of the second deflection portion 33a in the height direction of the vehicle, a clearance between the second deflection portion 33a and each of the first and second fitting pieces 47 and 48 is reduced, which restrains the first and second fitting pieces 47 and 48 from being dislocated in the height direction of the vehicle.

Furthermore, according to the aforementioned embodiment, the second fitting projection 46 is fitted to the first sliding portion 32 within the range of the portion of the first deflection portion 32b in the longitudinal direction of the vehicle. At this time, the second fitting projection 46 is exposed in the height direction of the vehicle relative to the first deflection portion 32b. As a result, an enlargement of the first sliding portion 32 in the height direction of the vehicle is restrained and further the enlargement of the guide rail 13 in the height direction is restrained. The decrease of the head clearance in association with the enlargement of the guide rail 13, for example, in the height direction is restrained. In addition, because the second fitting projection 46 is arranged so as to overlap the top portion of the first deflection portion 32b in the height direction of the vehicle, a clearance between the first deflection portion 32b and the second fitting projection 46 is maximized. As a result, because of the aforementioned arrangement of the second fitting projection 46, an interference between the first sliding portion 32 (the first deflection portion 32b and the fitting groove 32c) and the second fitting projection 46 provided at the first side of the base portion 42 and excessively inserted into the first sliding portion 32 may be restrained in a case where the plate member 41 is assembled on the body member 31 in the aforementioned manner.

Furthermore, according to the aforementioned embodiment, the first and second fitting projections 45 and 46 provided at the first side of the base portion 42 and connected to the driving force transmission member 26 are formed at the plate member 41 to thereby ensure a strength for the transmission of the driving force from the driving force transmission member 26.

Furthermore, according to the aforementioned embodiment, the body member 31 and the plate member 41 are united by the fitting of the first and second fitting projections 45 and 46, and the first and second fitting pieces 47 and 48 relative to the first and second sliding portions 32 and 33 sliding on the guide rail 13. Thus, the body member 31 and the plate member 41 may be united with a less influence of vehicle vibration, for example.

Furthermore, according to the aforementioned embodiment, the body member 31 is configured so as to integrally include the first and second sliding portions 32 and 33, and the seat portion 34. Thus, even the driving force from the driving force transmission member 26 is transmitted via the first and second fitting projections 45 and 46 at the first side of the base portion 42, the first and second sliding portions 32 and 33 are restrained from being displaced from each other in the longitudinal direction of the vehicle.

Furthermore, according to the aforementioned embodiment, the second fitting projection 46 is fitted to the first sliding portion 32 within the range of the portion of the first deflection portion 32*b* in the longitudinal direction of the vehicle. Thus, compared to a case where the first deflection portion 32*b* and the second fitting projection 46 are arranged to be displaced in the longitudinal direction of the vehicle, for example, an enlargement of the rear shoe 21 in the longitudinal direction of the vehicle is restrained. In the same way, the first and second fitting pieces 47 and 48 are fitted to the second sliding portion 33 within the range of the portion of the second deflection portion 33*a* in the longitudinal direction of the vehicle. Thus, compared to a case where the second deflection portion 33*a* and the first and second fitting pieces 47 and 48 are arranged to be displaced in the longitudinal direction of the vehicle, the enlargement of the rear shoe 21 in the longitudinal direction of the vehicle is restrained. As a result, a decrease of the moving amount of the rear shoe 21 in the longitudinal direction of the vehicle is restrained. Further, an opening amount (an interior opening) of the opening portion 12 by the movable panel 15 may be appropriately specified.

Furthermore, according to the aforementioned embodiment, the first and second deflection portions 32*b* and 33*a* elastically make contact with the guide rail 13 in a case where the first and second sliding portions 32 and 33 slide on the guide rail 13. Thus, the sliding of the first and second sliding portions 32 and 33 on the guide rail 13 is stabilized while the sliding resistance is appropriately specified.

Furthermore, according to the aforementioned embodiment, the assembly direction of the plate member 41 relative to the body member 31 (i.e., the width direction of the vehicle) is specified to be perpendicular to the moving direction of the rear shoe 21 (i.e., the longitudinal direction of the vehicle), thereby restraining the plate member 41 from disengaging from the body member 31.

The aforementioned embodiment may be modified as below. The number of fitting projections provided at the first side of the base portion 42 may be appropriately specified.

Either the first stay portion 43 or the second stay portion 44 may be omitted. In addition, according to the aforementioned embodiment, the distance L1 between the first and second sliding portions 32 and 33 in the width direction of the vehicle is defined to be a substantive distance so that the first and second fitting pieces 47 and 48, and the base portion 42 are mountable to the seat portion 34 in the temporary assembly state of the plate member 41 relative to the body member 31. For example, the first and second sliding portions 32 and 33, and the base portion 42 may be arranged in a partially concavo-convex manner in the width direction of the vehicle while avoiding the interference between the first and second sliding portions 32 and 33, and the base portion 42.

The body member 31 may be commonly applied to the both sides of the opening portion 12 (the movable panel 15) in the width direction of the vehicle. In the same way, the plate member 41 may be commonly applied to the both sides of the opening portion 12 (the movable panel 15) in the width direction of the vehicle. As a result, the number of types of components constituting the sunroof apparatus 10 is reduced.

The aforementioned explanation of the rear shoe 21 may be applied to the front shoe 22. In this case, it is not necessary to connect the front shoe 22 to the driving force transmission member 26 via the plate member 41.

In the aforementioned embodiment, configurations of the functional member 14 related to the open and close operation of the movable panel 15 is an example. For example, the guide bore 23*a* may be provided at the rear shoe 21 while the support pin 25 inserted into the guide bore 23*a* may be provided at the support member 23. In addition, a series of operations of the movable panel 15 (i.e., the tilt-up, tilt-down, and slide operations) may be achieved only by the movement of the functional member 14 in the rearward direction of the vehicle.

According to the aforementioned embodiment, the seat portion 34 includes the front rib 34*a* and the rear rib 34*b* formed to project while being in contact with or positioned close to the front end and the rear end of the base portion 42 in the longitudinal direction of the vehicle.

In addition, according to the aforementioned embodiment, the base portion 42 includes the through-hole 50 extending in the height direction of the vehicle, and the seat portion 34 includes the hook portion 36 projecting in the height direction of the vehicle and loosely inserted into the through-hole 50, the hook portion 36 including the hook 36*a* that engages with the upper surface of the edge portion of the through-hole 50 at one side in the width direction of the vehicle.

Further, according to the aforementioned embodiment, the first and second sliding portions 32, 33 include the first and second deflection portions 32*b*, 33*a* each supported at the two positions that are separated from each other in the longitudinal direction and being curved in the height direction of the vehicle to elastically make contact with the guide rail 13. The first and second fitting pieces 47, 48 are fitted to the second sliding portion 33 in a state to be exposed to the second deflection portion 33*a* in the height direction of the vehicle within the range of the portion of the second deflection portion 33*a* excluding the top portion of the second deflection portion 33*a* in the longitudinal direction of the vehicle.

Further, according to the aforementioned embodiment, the first and second fitting projections 45, 46 extend through the first sliding portion 32 to be connected to the driving force transmission member 26 driven to move in the longitudinal direction of the vehicle.

Further, according to the aforementioned embodiment, the assembly direction of the plate member 41 relative to the body member 31 is perpendicular to the moving direction of the rear shoe 21.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roof apparatus for a vehicle, comprising:
a movable panel opening and closing an opening portion formed at a roof portion of a vehicle body of the vehicle;

a support member supporting the movable panel;
a shoe member including a body member made of resin and integrally including first and second sliding portions arranged side by side in a width direction of the vehicle and sliding on a guide rail provided at an edge portion of the opening portion in the width direction of the vehicle, and a seat portion disposed between the first and second sliding portions and connected to the first and second sliding portions in the width direction of the vehicle, the shoe member including a plate member made of steel plate and integrally including a base portion mounted to the seat portion, a stay portion engaging with the support member, and first and second fitting portions provided at first and second sides of the base portion in the width direction of the vehicle and projecting from the base portion towards the first and second sides to be fitted to the first and second sliding portions respectively, the shoe member being movable along the guide rail in a longitudinal direction of the vehicle;
an engagement recess formed at the base portion to open in a height direction of the vehicle; and
an engagement protrusion formed at the seat portion to be elastically deformable in the height direction of the vehicle and being inserted into the engagement recess,
wherein a distance between the first and second sliding portions is specified to be greater than a distance obtained by a sum of a length of the base portion in the width direction of the vehicle and a projection length of the second fitting portion at the second side, and to be smaller than a distance obtained by a sum of the length of the base portion in the width direction of the vehicle, the projection length of the second fitting portion at the second side, and a projection length of the first fitting portion at the first side.

2. The roof apparatus according to claim 1, wherein the seat portion includes a first rib and a second rib formed to project while being in contact with or positioned close to respective ends of the base portion in the longitudinal direction of the vehicle.

3. The roof apparatus according to claim 1, wherein the base portion includes a through-hole extending in the height direction of the vehicle, and the seat portion includes a hook portion projecting in the height direction of the vehicle and loosely inserted into the through-hole, the hook portion including a hook that engages with an upper surface of an edge portion of the through-hole at one side in the width direction of the vehicle.

4. The roof apparatus according to claim 1, wherein the first and second sliding portions include first and second deflection portions each supported at two positions that are separated from each other in the longitudinal direction and being curved in the height direction of the vehicle to elastically make contact with the guide rail and wherein one of the first and second fitting portions is fitted to one of the first and second sliding portions in a state to be exposed to one of the first and second deflection portions in the height direction of the vehicle.

5. The roof apparatus according to claim 1, wherein one of the first and second fitting portions extends through one of the first and second sliding portions to be connected to a driving force transmission member driven to move in the longitudinal direction of the vehicle.

6. The roof apparatus according to claim 1, wherein an assembly direction of the plate member relative to the body member is perpendicular to a moving direction of the shoe member.

* * * * *